US012140370B2

(12) United States Patent
Wang et al.

(10) Patent No.: US 12,140,370 B2
(45) Date of Patent: Nov. 12, 2024

(54) REFRIGERATOR DOOR BODY

(71) Applicants: QINGDAO HAIER SPECIAL REFRIGERATOR CO., LTD., Qingdao (CN); QINGDAO HAIER REFRIGERATOR CO., LTD., Qingdao (CN); HAIER SMART HOME CO., LTD., Qingdao (CN)

(72) Inventors: Wenchun Wang, Qingdao (CN); Hao Zhang, Qingdao (CN); Jiaming Li, Qingdao (CN); Tong Xu, Qingdao (CN)

(73) Assignees: QINGDAO HAIER SPECIAL REFRIGERATOR., LTD., Qingdao (CN); QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 64 days.

(21) Appl. No.: 17/925,602

(22) PCT Filed: Apr. 12, 2021

(86) PCT No.: PCT/CN2021/086442
§ 371 (c)(1),
(2) Date: Nov. 15, 2022

(87) PCT Pub. No.: WO2021/213201
PCT Pub. Date: Oct. 28, 2021

(65) Prior Publication Data

US 2023/0175762 A1 Jun. 8, 2023

(30) Foreign Application Priority Data

May 15, 2020 (CN) ........................ 202020821891.8

(51) Int. Cl.
*F25D 23/04* (2006.01)
*H01H 36/00* (2006.01)

(52) U.S. Cl.
CPC ............ *F25D 23/04* (2013.01); *H01H 36/00* (2013.01); *F25D 2400/40* (2013.01)

(58) Field of Classification Search
CPC ...... F25D 23/04; F25D 2400/40; F25D 23/02; F25D 23/028; H01H 36/00; H01R 13/73
See application file for complete search history.

(56) References Cited

U.S. PATENT DOCUMENTS 6,159,041 A * 12/2000 Davis .................. H01R 13/567 439/942
6,478,586 B1 * 11/2002 Ma ......................... H01R 13/26 439/924.1

(Continued)

FOREIGN PATENT DOCUMENTS

CN 106052255 A 10/2016
CN 106642904 A 5/2017

(Continued)

OTHER PUBLICATIONS

CN 106979654 translation (Year: 2017).*

*Primary Examiner* — Hiwot E Tefera
(74) *Attorney, Agent, or Firm* — Cheng-Ju Chiang

(57) ABSTRACT

Provided by the present invention is a refrigerator door body, having a door lining and a storage device installed on the door lining. A hanging lug and a matching groove that match each other are provided between the door lining and the storage device, wherein a power supply module for supplying power to the storage device is provided between the hanging lug and the matching groove. The refrigerator door body also has a switch mechanism that controls the power supply module to turn on and off. The switch mechanism is configured to: turn on the power supply module for power (Continued)

supply when the storage device is installed on the door lining, and turn off the power supply module when the storage device is separated from a door lining installation position. The refrigerator door body of the present invention improves the safety of a user during use.

8 Claims, 8 Drawing Sheets

(56) References Cited

U.S. PATENT DOCUMENTS

| | | | | |
|---|---|---|---|---|
| 7,677,919 | B1 * | 3/2010 | Lin | H01R 13/113 439/682 |
| 9,905,948 | B1 * | 2/2018 | Yu | H01R 12/7082 |
| 2001/0053066 | A1 * | 12/2001 | Malnati | F25D 29/005 361/752 |
| 2007/0102447 | A1 * | 5/2007 | Fulton | F25D 23/126 222/144.5 |
| 2008/0164225 | A1 * | 7/2008 | McCoy | H01R 31/06 211/26.1 |
| 2009/0145138 | A1 | 6/2009 | Ethier et al. | |
| 2009/0229298 | A1 * | 9/2009 | Allard | H05K 5/0247 62/449 |
| 2009/0293511 | A1 * | 12/2009 | Allard | F25D 23/12 62/449 |
| 2009/0302724 | A1 * | 12/2009 | Allard | B67D 3/00 312/237 |
| 2010/0276442 | A1 * | 11/2010 | Querfurth | F25D 23/12 62/449 |
| 2011/0110706 | A1 * | 5/2011 | Allard | F25D 23/04 439/116 |
| 2018/0192807 | A1 * | 7/2018 | Hall | A47B 96/1416 |
| 2020/0191468 | A1 * | 6/2020 | Allard | F25D 23/066 |
| 2021/0302093 | A1 * | 9/2021 | El Sayed | F25D 23/028 |

FOREIGN PATENT DOCUMENTS

| | | | | |
|---|---|---|---|---|
| CN | 106885418 A | | 6/2017 | |
| CN | 106979654 A | | 7/2017 | |
| CN | 206890943 U | | 1/2018 | |
| CN | 212778175 U | | 3/2021 | |
| TW | I656311 B | * | 4/2019 | F25D 23/02 |

* cited by examiner

REFRIGERATOR DOOR BODY

TECHNICAL FIELD

The present invention relates to a refrigerator door body, and particularly to a more intelligent refrigerator door.

BACKGROUND

As refrigerators develop gradually in a more intelligent tendency, storage devices on the refrigerator door body have increasing functions. To achieve these functions, a powering device for powering the storage devices needs to be mounted on the door body. Therefore, a door lining of the refrigerator door body needs to be provided with a hanging lug for supporting the storage devices as well as with the powering device. However, when the storage device is removed, the powering device is still in a power-on state, which is prone to cause the user's inadvertent contact of the hanging lug, thereby causing danger.

In view of this, it is necessary to improve the conventional refrigerator door body to solve the above problems.

SUMMARY

An object of the present invention is to provide a more intelligent refrigerator door body.

The present invention is directed to a refrigerator door body, comprising a door lining and a storage device mounted on the door lining, a hanging lug and a matching groove which are engageable with each other being disposed between the door lining and the storage device, wherein a power supply module for powering the storage device is disposed between the hanging lug and the matching groove, the refrigerator door body further has a switch mechanism controlling the power supply module to turn on or turn off, and the switch mechanism is configured in a way that the power supply module is turned on and supplies power when the storage device is mounted on the door lining, and that the power supply module is turned off when the storage device disengages from a mounting position of the door lining.

Further, the hanging lug has a housing fixed on the door lining, the power supply module further comprises a circuit board fixed in the housing, and the switch mechanism comprises a magnetic switch disposed on the circuit board and a magnet disposed on the storage device.

Further, the housing is fixed on a side wall of the door lining, the circuit board is vertically disposed in the housing, the magnetic switch has an elastic terminal disposed on the circuit board and a conduction and connection point disposed on the circuit board and cooperating with the elastic terminal, both the conduction and connection point and the elastic terminal are disposed on a side of the circuit board in the transverse direction and away from the storage device, the magnet is disposed on a side wall of the storage device in the transverse direction and close to the hanging lug; when the storage device is mounted on the door lining, the elastic terminal, affected by the attraction of the magnet, forms conduction with the conduction and connection point; when the storage device disengages from the mounting position of the door lining, the elastic terminal breaks away from the attraction of the magnet and disengages from the conduction and connection point.

Further, the magnet is disposed on an inner wall of the matching groove in the transverse direction of the door body and towards the hanging lug.

Further, the power supply module further comprises a first connector disposed on the housing, and a second connector disposed at the matching groove, the first connector is electrically connected to the circuit board and disposed exposed outward, and the first connector and second connector are docked with each other in cooperation after the storage device is mounted.

Further, the first connector has a connection terminal electrically connected to the circuit board, the housing is provided with a through hole for the connection terminal to pass therethrough, and the connection terminal has a connection portion electrically connected to the second connector and a welding portion passing through the through hole and welded with the circuit board.

Further, the housing has a support wall located atop, a shielding portion formed on a side of the support wall close to the storage device, the support wall is formed with an inner recess that is recessed downward, and the connection portion is located in a space formed by the inner recess and the shielding portion.

Further, the refrigerator door body further comprises a power supply line electrically connected to the circuit board, an end of the power supply line is provided with a socket, and the circuit board is provided with a plug mated with the socket.

Further, the housing has opposing first side walls and second side walls disposed adjacent to the storage device, the first side walls are arranged asymmetrically, and side edges of the circuit board facing inner walls of the first side walls are also arranged asymmetrically.

Further, the hanging lug further comprises an indicator light disposed on the circuit board, and the housing is further provided with a hollowed portion that matches a shape of the indicator light so that the indicator light extends into the hollowed portion.

The advantageous effects of the present invention are as follows: the present invention is provided with the power supply module through the engagement between the hanging lug and the matching groove, and with the switch mechanism for controlling the power supply module to turn on or turn off; the switch mechanism is configured in a way that the power supply module is turned on and supplies power when the storage device is mounted on the door lining, and that the power supply module is turned off when the storage device disengages from the mounting position of the door lining. As such, when the storage device is removed, the hanging lug is in the turn-off state, thereby improving the safety.

DETAILED DESCRIPTION

Figure 1:
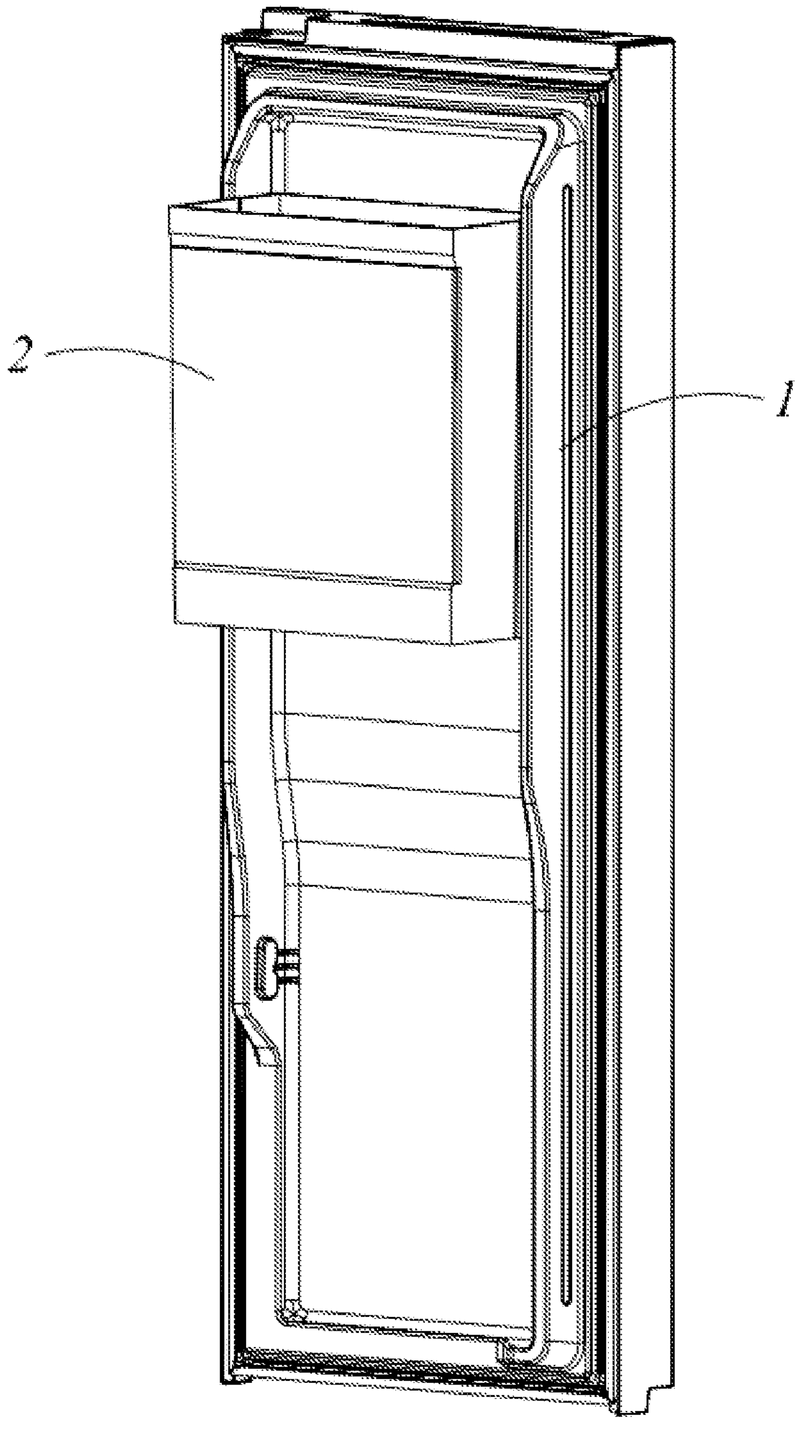
FIG. 1 is a perspective view of a refrigerator door body according to the present invention.
Figure 2:
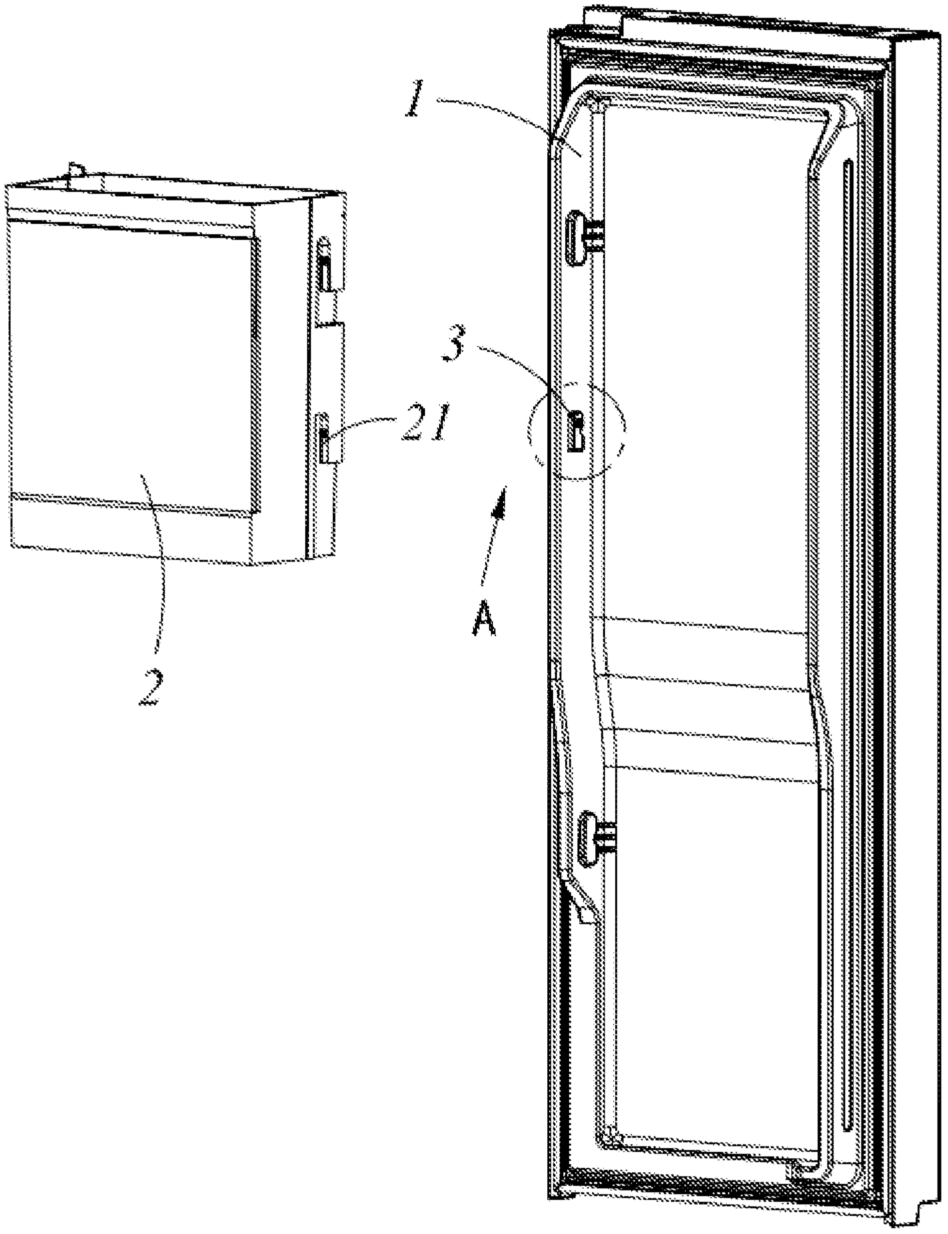
FIG. 2 is an exploded perspective view of FIG. 1.
Figure 3:
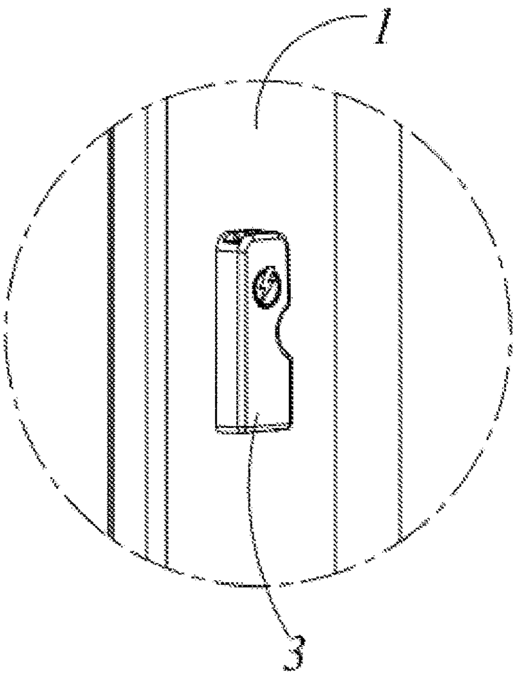
FIG. 3 is an enlarged view of location A in FIG. 1.
Figure 4:
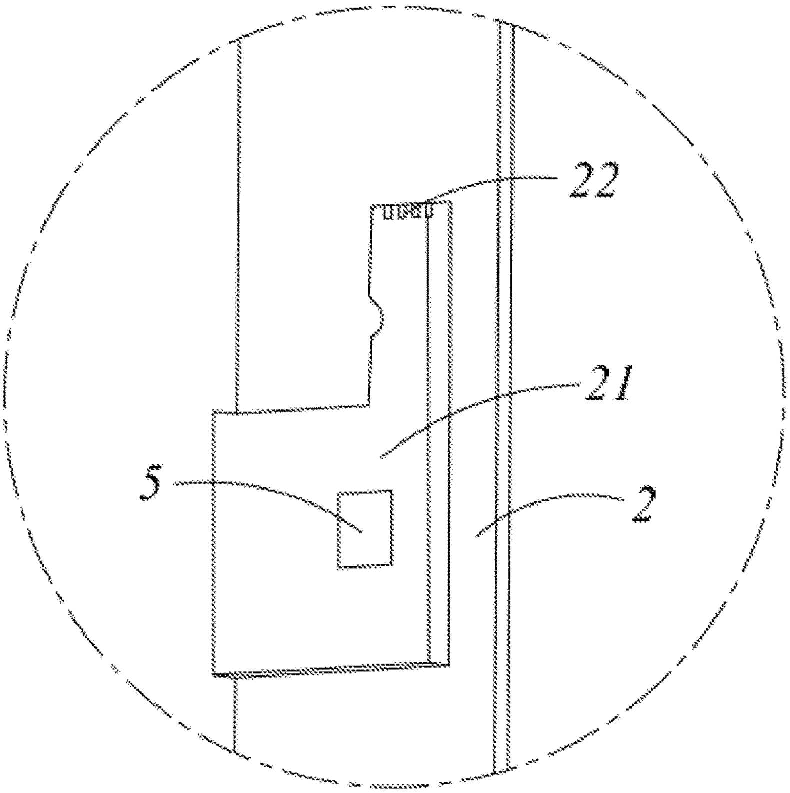
FIG. 4 is a partial perspective view of the other side of a storage device in FIG. 2.

In order to make those skilled in the art better understand the technical solutions of the present invention, the technical solutions in the embodiments of the present invention will be clearly and completely described below with reference to figures in the embodiments of the present invention. Obviously, the described embodiments are only partial embodiments of the present invention, but not all embodiments. Based on the embodiments of the present invention, all other embodiments obtained by those having ordinary skill in the art without making creative efforts should fall within the protection scope of the present invention.

Referring to FIG. 1 through FIG. 10, an embodiment of a refrigerator door body according to the present invention is illustrated. The refrigerator door body has a door lining 1 and a storage device 2 mounted on the door lining 1. A hanging lug 3 and a matching groove 21 which are engageable with each other are disposed between the door lining 1 and the storage device 2, wherein a power supply module is cooperatively disposed between the hanging lug 3 and the matching groove 21, the power supply module comprises a first connector 31 disposed on the hanging lug 3, and a second connector 22 disposed at the matching groove 21, wherein the first connector 31 and second connector 22 are docked with each other in cooperation after the storage device 2 is mounted.

Specifically, as shown in FIG. 2 through FIG. 7, the door lining 1 is arranged in an inwardly opened U-shape, the hanging lug 3 has a housing 32 fixed on a side wall of the door lining, the power supply module further comprises a circuit board 33 fixed in the housing 32, and the first connector 31 is electrically connected to the circuit board 33 and disposed exposed out of the housing 32.

The first connector 31 has a connection terminal electrically connected to the circuit board 33, the housing 32 is provided with a through hole 321 for the connection terminal to pass therethrough, and the connection terminal has a connection portion 311 electrically connected to the second connector 22 and a welding portion 312 passing through the through hole 321 and welded with the circuit board 33. In the present embodiment, the first connector 31 is the connection terminal.

In the present embodiment, the housing 32 has a support wall 322 located atop, a pair of first side walls 323 that are disposed spaced-apart in a front-rear direction and connected to the support wall 322, and second side walls 324 disposed transversely and connected to the pair of first side walls 323 and the support wall 322, the through hole 321 runs through the support wall 322 in a top-down direction, the connection portion 311 is exposed out of an upper surface of the support wall 322, and the second connector 22 is disposed on an upper inner wall of the matching groove 21.

The first side walls 323 are arranged asymmetrically, and side edges of the circuit board 33 facing the inner walls of the first side walls 323 are also arranged asymmetrically. In the present embodiment, one of the first side walls 323 has a recess which is inwardly recessed and cooperates with a protrusion on the matching groove 21 to fix the storage device 2. As such, the hanging lug 3 and the circuit board 33 can be mounted conveniently to avoid a mounting error.

Certainly, in other embodiments, the through hole 321 can also be disposed on the first side wall 323 or the second side wall 324, the connection portion 311 is exposed on an outer surface of the first side wall 323 or the second side wall 324, and the second connector 22 only needs to be disposed in the matching groove 21 at a position corresponding to the first side wall 323 or the second side wall 324.

The housing 32 further has a shielding portion 327 formed on a side of the support wall 322 in a transverse direction and close to the storage device 2, the support wall 322 is formed with an inner recess 326 that is recessed downward, and the connection portion 311 is located in a space formed by the inner recess 326 and the shielding portion 327. As such, the first connector 31 is fixed more firmly, and furthermore, when the storage device 2 is mounted on the hanging lug 3, the shielding portion 327 can shield the first connector 31 and the second connector 22 to increase the aesthetics.

The refrigerator door body further comprises a power supply line (not shown) electrically connected to the circuit board 33, an end of the power supply line is provided with a socket, and the circuit board 33 is provided with a plug mated with the socket. As such, when the hanging lug 3 is damaged, it can be easily detached for replacement or maintenance.

Certainly, in other embodiments, the power supply line can also be directly connected to the first connector 31 or the circuit board 33 to power the second connector 22. For example, the first connector 31 is a socket disposed at the end of the power supply line, and the second connector 22 is a plug mated with the socket. As such, the structure is very simple and the cost is low.

Figure 5:
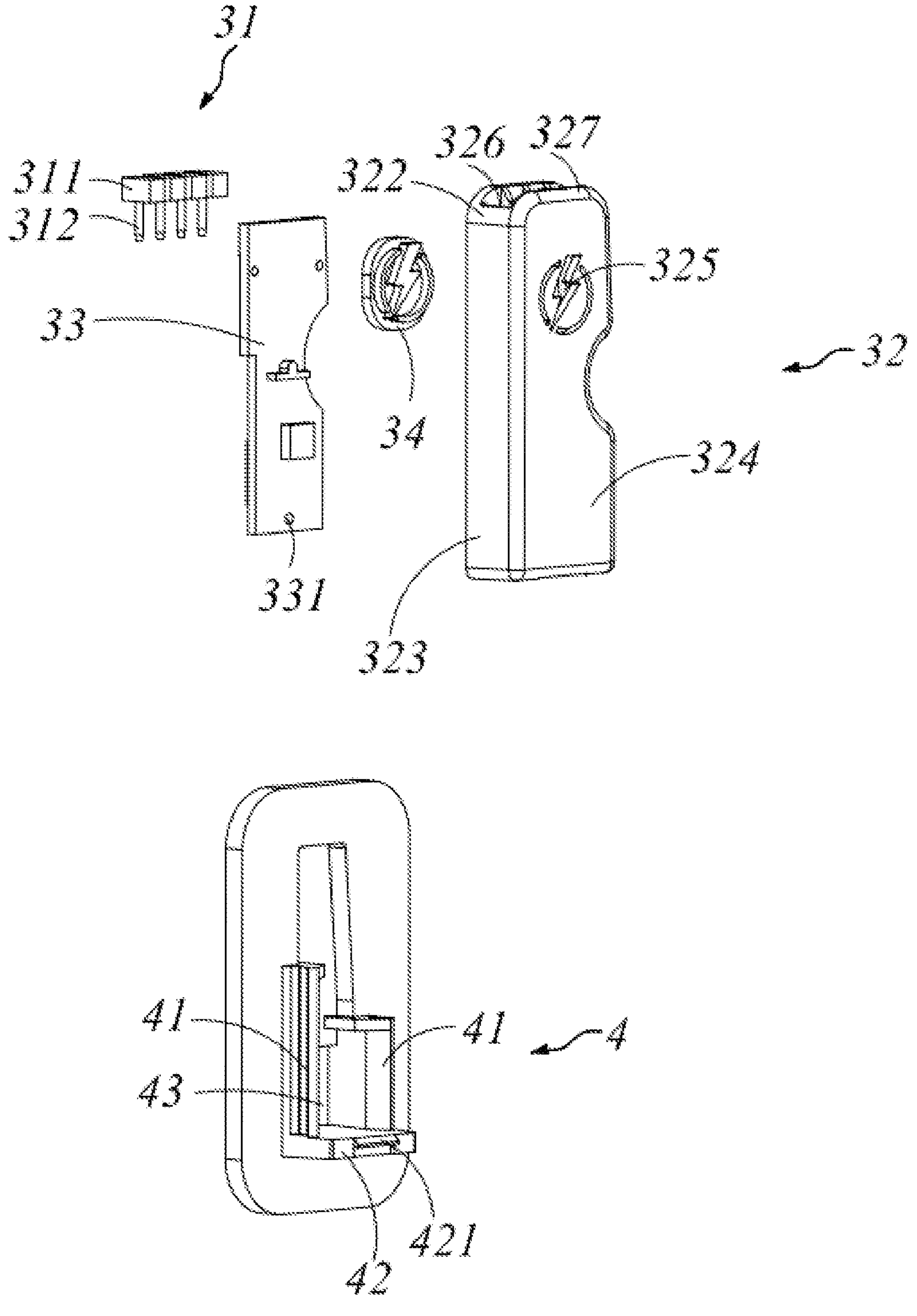
FIG. 5 is an exploded perspective view of a hanging lug and a fixing member in FIG. 2.
Figure 6:
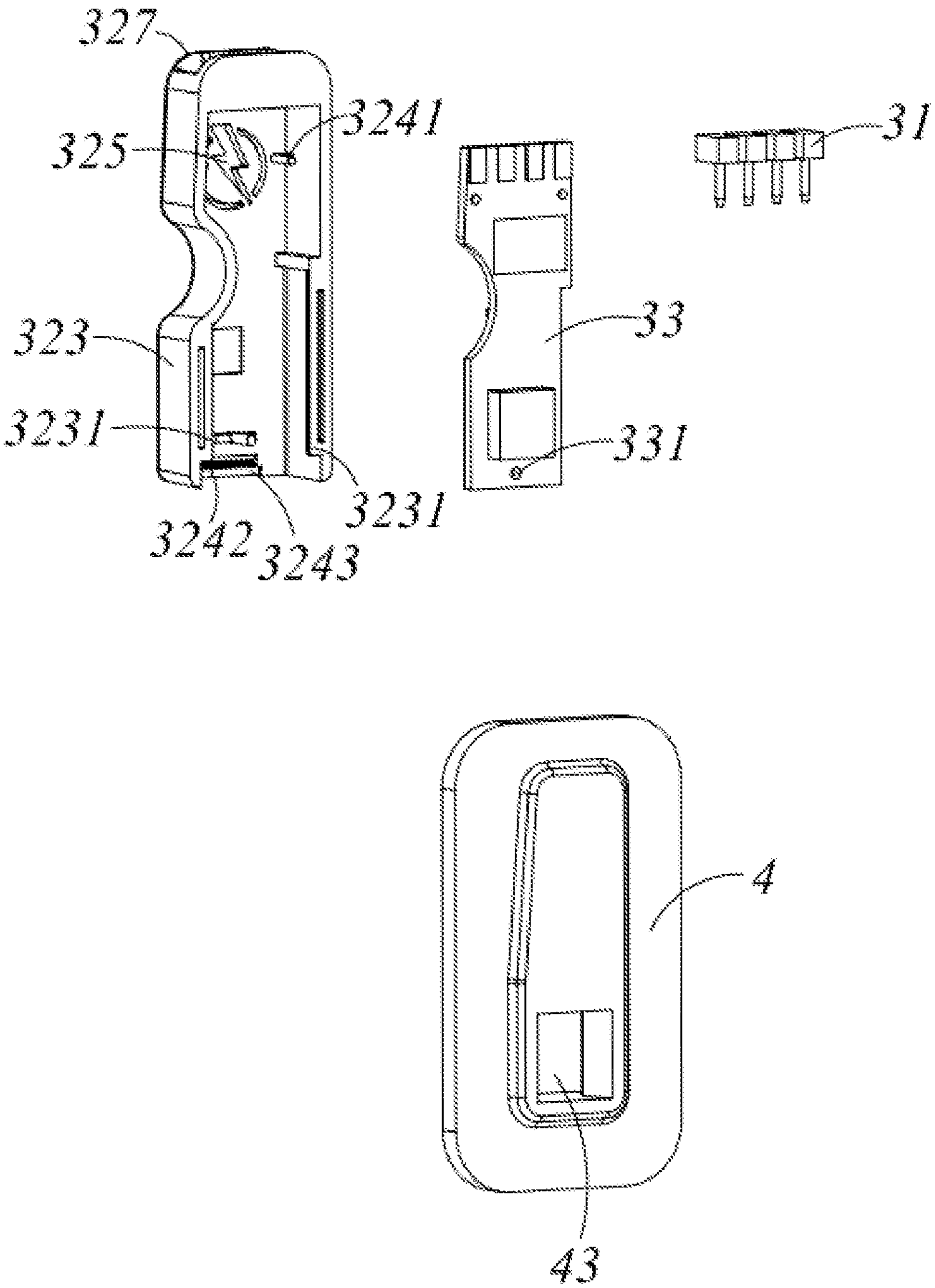
FIG. 6 is an exploded perspective view of FIG. 5 from another perspective.
Figure 7:
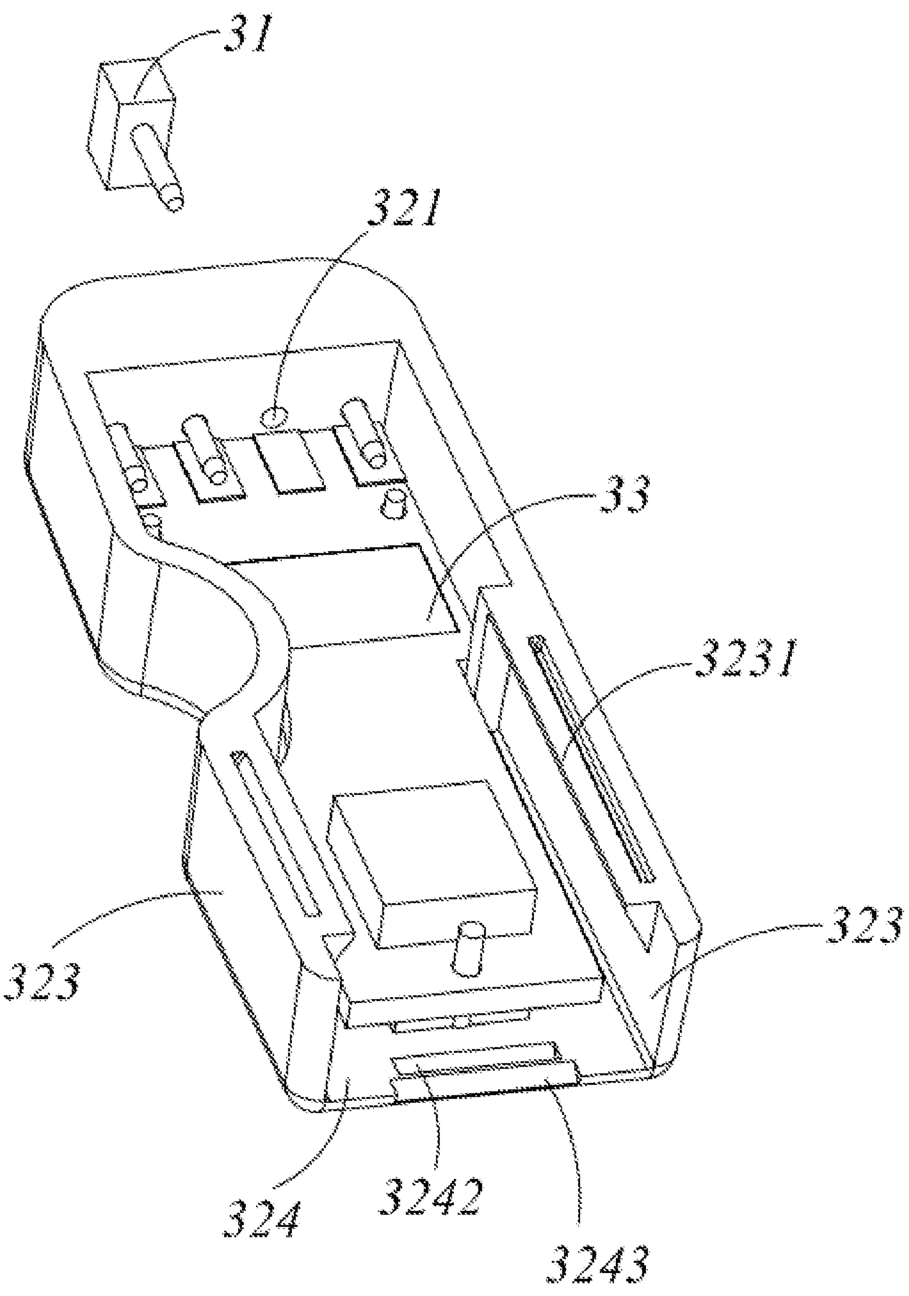
FIG. 7 is an exploded perspective view of the hanging lug in FIG. 5 from another perspective.
Figure 8:
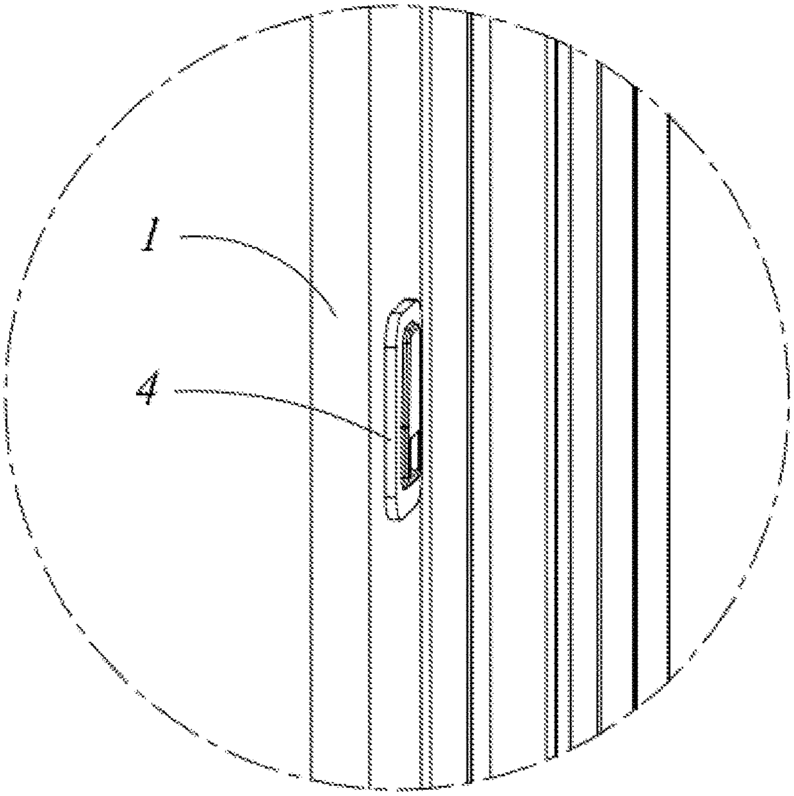
FIG. 8 is a perspective view of the fixing member located in a foamed layer of a door lining.
Figure 9:
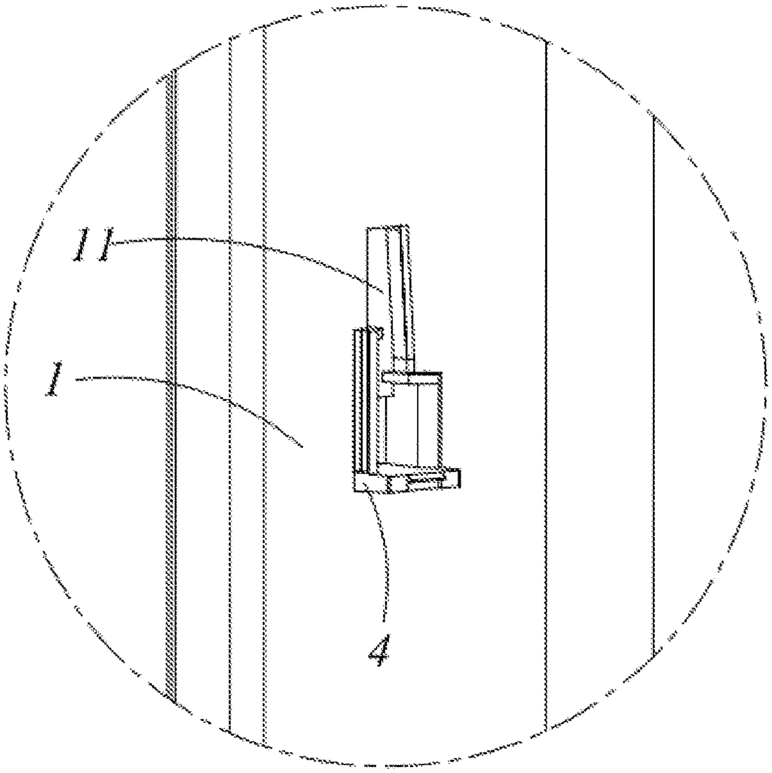
FIG. 9 is a perspective view of the door lining after the hanging lug is hidden.

As shown in FIG. 5 through FIG. 7, in the present embodiment, the second side wall 324 has a plurality of positioning posts 3241 formed protruding from an inner wall thereof, the circuit board 33 has positioning holes 331 mated with the positioning posts 3241, and then the circuit board 33 is fixed on the housing 32 by gluing or in a snap-fitting manner. As such, more electrical components can be disposed on the circuit board 33 to meet more demands and realize more functions.

Figure 10:
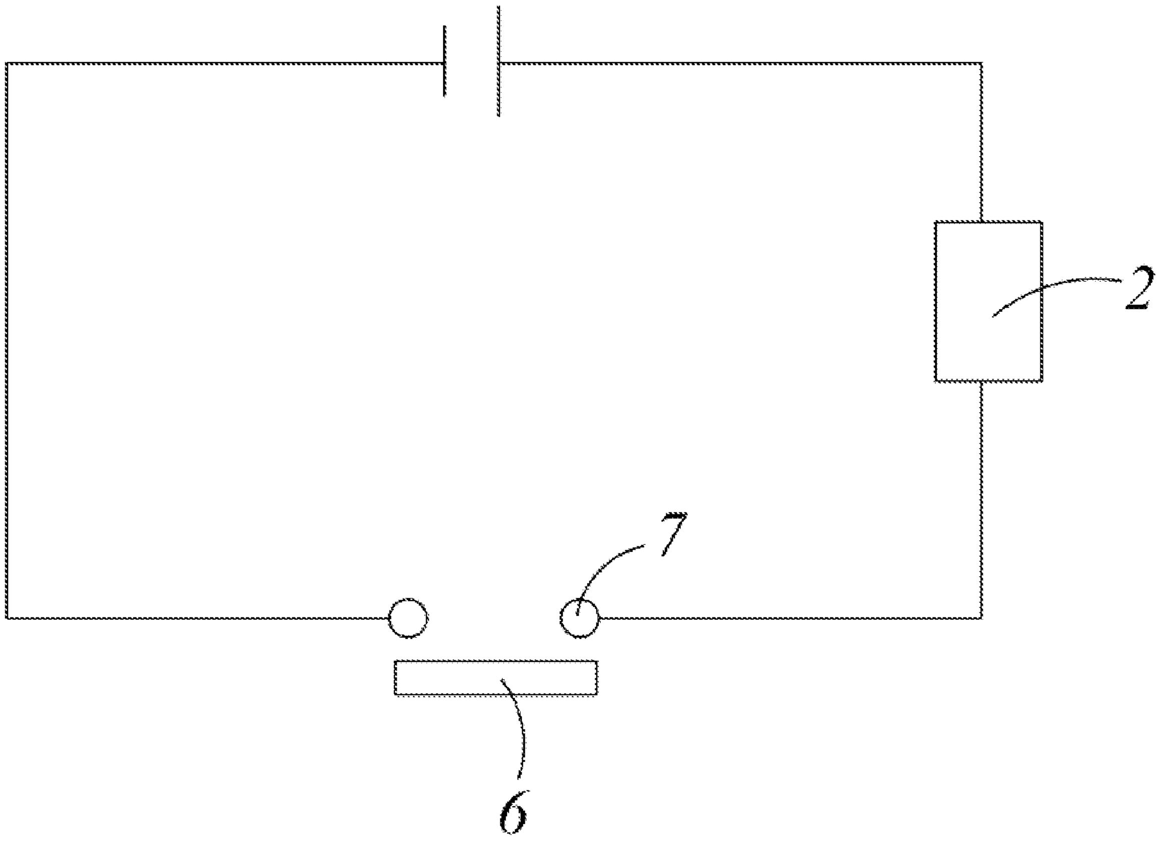
FIG. 10 is a plan view of a switch mechanism.

Specifically, as shown in FIG. 10, in the present embodiment, the refrigerator door body further has a switch mechanism controlling the power supply module to turn on or turn off; the switch mechanism is configured in a way that the power supply module is turned on and supplies power when the storage device 2 is mounted on the door lining 1, and that the power supply module is turned off when the storage device 22 disengages from the mounting position of the door lining 1. The switch mechanism comprises a magnetic switch disposed on the circuit board 33 and a magnet 5 disposed on the storage device.

In the present embodiment, the circuit board 33 is vertically disposed in the housing 32, the magnetic switch has an elastic terminal 6 disposed on the circuit board 33 and a conduction and connection point 7 disposed on the circuit board 33 and cooperating with the elastic terminal, both the conduction and connection point 7 and the elastic terminal 6 are disposed on a side of the circuit board 33 in the transverse direction and away from the storage device 2, and the magnet 5 is disposed on a side wall of the storage device 2 in the transverse direction and close to the hanging lug 3.

The magnet 5 is disposed on an inner wall of the matching groove 21 in the transverse direction of the door body and towards the hanging lug 3. As such, the space of the matching groove 21 can be used sufficiently, and meanwhile the hidden-type design of the magnet 5 can also be achieved.

A specific operation process of the switch mechanism is as follows: when the storage device 2 is mounted on the hanging lug 3, the magnet 5 attracts the elastic terminal 6 so that the elastic terminal 6 contacts the conduction and connection point 7, thereby achieving the turn-on of the circuit; when the storage device 2 is removed, the elastic terminal 6 loses the attraction of the magnet 5 and restores to the original state, thereby turning off the circuit.

The housing 32 further has a pair of sliders 3231 protruding from inner walls of the pair of first side walls 323, opposed to each other and extending in an up-down direction, and a catching slot 3242 recessed from an inner wall of the second side wall 324. The inner wall of the second side wall 324 further has a guide portion 3243 that is located below the catching slot 3242 and disposed inclined.

In the present embodiment, the side wall of the door lining has a mounting hole 11 running through in a transverse direction; the refrigerator door body further comprises a fixing member 4 fixed in the mounting hole 11; the fixing member 4 has a pair of slide rails 41 matched with the pair of sliders 3231, and a bottom plate 42 located below the pair of slide rails 41; the bottom plate 42 is protrudingly provided, on a side in the transverse direction, with a snap 421 for engaging with the catching slot 3242. As such, with the fixing member 4 being arranged, the foaming material can be prevented from overflowing outside the door lining 1 during the foaming process.

In the present embodiment, the fixing member 4 has a line through hole 43 located between the pair of slide rails 41 for the power supply line to pass therethrough, and the pair of slide rails 41 are disposed connected to the bottom plate 42. As such, not only the structural strength of the slide rail 41 and the bottom plate 42 can be increased, but also the connection of the power supply line with the circuit board 33 can be facilitated.

The hanging lug 3 further has an indicator light 34 disposed on the circuit board 33, and the side wall of the housing 32 in the transverse direction has a hollowed portion 325 that matches the shape of the indicator light 34 to accommodate the indicator light 34. The indicator light 34 can be used to indicate whether the hanging lug 3 is in a power-on state, that is, the indicator light 34 indicates that the hanging lug 3 is in the power-on state when it is on; the indicator light 34 can also indicates that the hanging lug 3 is in a power-off state, which can be set according to actual needs.

For example, the hanging lug 3 is set in the power-on state when the indicator light 34 is on, so that the user can be reminded to be careful that the hanging lug 3 is electrified when the storage device 2 is not mounted. Alternatively, the hanging lug 3 is set in the power-off state when the indicator light 34 is on. As such, when the storage device 2 is not mounted, the indicator light 34 can indicate to the user that the hanging lug 3 is in a safe state, and operations of the hanging lug 3 such as repair and replacement can be performed.

In the present embodiment, when the storage device 2 is removed, the indicator light 34 is in the turn-on state to thereby remind the user that the hanging lug 3 is in a de-energized, safe state at this time.

Specifically, in the present embodiment, the power supply line can be led from a door body hinge to the line through hole 43 of the fixing member 4, and then the line through hole 43 is sealed by a sealing member, and the foaming is stated. After the completion of foaming, the power supply line is exposed between the slide rails 41. When the hanging lug 3 is mounted, the power supply line is first plugged on the circuit board 33, then the sliders 3231 on the housing 32 are aligned with the slide rails 41 and slid from top to bottom, the catching slot 3242 and the snap 421 are made smoothly snap-fitted with each other under the action of the guide portion 3243, and finally the storage device 2 is mounted on the hanging lug 3 to achieve electrical connection.

The refrigerator door body of the present invention further provides another embodiment. The door lining 1 is manufactured by an injection molding process, the pair of slide rails 41 and the bottom plate 42 are formed by protruding from the side wall of the door lining in the transverse direction, and the hanging lug 3 is directly mounted on the side wall of the door lining.

To conclude, the refrigerator door body of the present invention is provided with the power supply module through the engagement between the hanging lug 3 and the matching groove 21, and with the switch mechanism for controlling the power supply module to turn on or turn off; the switch mechanism is configured in a way that the power supply module is turned on and supplies power when the storage device 2 is mounted on the door lining 1, and that the power supply module is turned off when the storage device 22 disengages from the mounting position of the door lining 1. As such, when the storage device 2 is removed, the hanging lug 3 is in the turn-off state, thereby improving the safety.

It should be understood that although the present specification is described based on embodiments, not every embodiment contains only one independent technical solution. Such a narration way of the present specification is only for the sake of clarity. Those skilled in the art should take the present specification as an entirety. The technical solutions in the respective embodiments can be combined properly to form other embodiments which can be understood by those skilled in the art.

So far, a person skilled in the art shall know that although a plurality of exemplary embodiments of the present invention have been described above in detail, various variations and improvements can be directly determined or deducted from the content disclosed by the present invention without departing from the spirit and scope of the present invention. Therefore, all those variations and improvements shall be deemed to be covered by the scope of the present invention.

What is claimed is:

1. A refrigerator door body, comprising a door lining and a storage device mounted on the door lining, a hanging lug and a matching groove which are engageable with each other being disposed between the door lining and the storage device, wherein a power supply module for powering the storage device is disposed between the hander hanging lug and the matching groove, the refrigerator door body further has a switch mechanism controlling the power supply module to turn on or turn off, and the switch mechanism is configured in a way that the power supply module is turned on and supplies power when the storage device is mounted on the door lining, and that the power supply module is turned off when the storage device disengages from a mounting position of the door lining;

wherein the hanging lug has a housing fixed on the door lining, the power supply module further comprises a circuit board fixed in the housing, and the switch mechanism comprises a magnetic switch disposed on the circuit board and a magnet disposed on the storage device;

wherein the housing is fixed on a side wall of the door lining, the circuit board is vertically disposed in the housing, the magnetic switch has an elastic terminal disposed on the circuit board and a conduction and connection point disposed on the circuit board and cooperating with the elastic terminal, both the conduction and connection point and the elastic terminal are disposed on a side of the circuit board in the transverse direction and away from the storage device, the magnet is disposed on a side wall of the storage device in the transverse direction and close to the hanging lug; when the storage device is mounted on the door lining, the elastic terminal, affected by the attraction of the magnet, forms conduction with the conduction and connection point; when the storage device disengages from the mounting position of the door lining, the elastic terminal breaks away from the attraction of the magnet and disengages from the conduction and connection point.

2. The refrigerator door body according to claim 1, wherein the magnet is disposed on an inner wall of the matching groove in the transverse direction of the door body and towards the hanging lug.

3. The refrigerator door body according to claim 1, wherein the power supply module further comprises a first connector disposed on the housing, and a second connector disposed at the matching groove, the first connector is electrically connected to the circuit board and disposed exposed outward, and the first connector and second connector are docked with each other in cooperation after the storage device is mounted.

4. The refrigerator door body according to claim 3, wherein the first connector has a connection terminal electrically connected to the circuit board, the housing is provided with a through hole for the connection terminal to pass therethrough, and the connection terminal has a connection portion electrically connected to the second connector and a welding portion passing through the through hole and welded with the circuit board.

5. The refrigerator door body according to claim 4, wherein the housing has a support wall located atop, a shielding portion formed on a side of the support wall close to the storage device, the support wall is formed with an inner recess that is recessed downward, and the connection portion is located in a space formed by the inner recess and the shielding portion.

6. The refrigerator door body according to claim 1, wherein the refrigerator door body further comprises a power supply line electrically connected to the circuit board, an end of the power supply line is provided with a socket, and the circuit board is provided with a plug mated with the socket.

7. The refrigerator door body according to claim 1, wherein the housing has opposing first side walls and second side walls disposed adjacent to the storage device, the first side walls are arranged asymmetrically, and side edges of the circuit board facing inner walls of the first side walls are also arranged asymmetrically.

8. The refrigerator door body according to claim 1, wherein the hanging lug further comprises an indicator light disposed on the circuit board, and the housing is further provided with a hollowed portion that matches a shape of the indicator light so that the indicator light extends into the hollowed portion.

* * * * *